(12) United States Patent
Shi et al.

(10) Patent No.: US 9,251,831 B2
(45) Date of Patent: *Feb. 2, 2016

(54) RECORDING MEDIUM AND METHOD OF FORMING THE SAME

(71) Applicant: MARVELL INTERNATIONAL LTD., Hamilton (BM)

(72) Inventors: Jianzhong Shi, Singapore (SG); Wee Kiat Lim, Singapore (SG)

(73) Assignee: Marvell International Ltd., Hamilton (BM)

( * ) Notice: Subject to any disclaimer, the term of this patent is extended or adjusted under 35 U.S.C. 154(b) by 257 days.

This patent is subject to a terminal disclaimer.

(21) Appl. No.: 13/946,648

(22) Filed: Jul. 19, 2013

(65) Prior Publication Data

US 2014/0030551 A1 Jan. 30, 2014

Related U.S. Application Data

(60) Provisional application No. 61/673,760, filed on Jul. 20, 2012.

(51) Int. Cl.
| | | |
|---|---|---|
| *G11B 5/667* | (2006.01) | |
| *G11B 5/84* | (2006.01) | |
| *G11B 5/66* | (2006.01) | |

(52) U.S. Cl.
CPC ............ *G11B 5/667* (2013.01); *G11B 5/66* (2013.01); *G11B 5/84* (2013.01)

(58) Field of Classification Search
None
See application file for complete search history.

(56) References Cited

U.S. PATENT DOCUMENTS

| | | | |
|---|---|---|---|
| 5,119,248 A * | 6/1992 | Bizjak et al. | 360/75 |
| 6,873,482 B1 * | 3/2005 | Hsieh et al. | 360/48 |
| 7,782,562 B2 * | 8/2010 | Kamata et al. | 360/71 |
| 8,298,690 B2 * | 10/2012 | Hieda et al. | 428/836 |
| 8,867,171 B2 * | 10/2014 | Yuan et al. | 360/135 |
| 2004/0051994 A1 * | 3/2004 | Akiyama et al. | 360/77.07 |
| 2005/0095402 A1 * | 5/2005 | Kaizu et al. | 428/167 |
| 2008/0075979 A1 * | 3/2008 | Inamura et al. | 428/828 |
| 2008/0291572 A1 * | 11/2008 | Sakurai et al. | 360/131 |
| 2009/0161255 A1 * | 6/2009 | Maeda | 360/110 |
| 2012/0019960 A1 * | 1/2012 | Sakurai et al. | 360/135 |
| 2012/0044597 A1 * | 2/2012 | Yoshida | 360/110 |
| 2013/0128377 A1 * | 5/2013 | Leong et al. | 360/55 |
| 2013/0142022 A1 * | 6/2013 | Zhang et al. | 369/30.25 |
| 2013/0155826 A1 * | 6/2013 | Zhang et al. | 369/30.25 |
| 2015/0146322 A1 * | 5/2015 | Bi | G11B 19/2009 360/99.08 |

* cited by examiner

*Primary Examiner* — Kevin Bernatz

(57) ABSTRACT

In various embodiments, a recording medium may be provided. The recording medium may include a servo layer. The recording medium may further include a data recording layer. The recording medium may additionally include a crystal-like soft underlayer (SUL). The data recording layer and the servo layer may be on a same side of the crystal-like soft underlayer.

17 Claims, 12 Drawing Sheets

| Sample # | Hc (Oe) | S | S* | Theta_s | Theta_r | H_n(Oe) |
|---|---|---|---|---|---|---|
| D20120213-B11 (Recording layer) | 5316 | 0.966 | 0.502 | 14.233 | 13.747 | -1485 |
| D20120213-B11 (Dedicated servo layer) | 10310 | 1.285 | 0.861 | 2.844 | 3.653 | -8983 |

| Sample ID | Hc | S | S* | Theta_s | Theta_r | H_n | 700b |
|---|---|---|---|---|---|---|---|
| | 714 | 722 | 724 | 716 | 718 | 720 | |
| D20120327-B2 | 1265 | 1.189 | 0.413 | 16.116 | 19.17 | -804 | |
| D20120327-B3 | 5709 | 1.076 | 0.601 | 18.755 | 20.184 | -3392 | |
| D20120327-B4 | 7416 | 1.112 | 0.626 | 16.252 | 18.076 | -4574 | |

800 providing a servo layer — 802 providing a data recording layer — 804 providing a crystal-like soft underlayer, wherein the servo layer and the data recording layer are provided on a same side of the crystal-like soft underlayer — 806

RECORDING MEDIUM AND METHOD OF FORMING THE SAME

CROSS-REFERENCE TO RELATED APPLICATIONS

This application claims the benefit of priority of U.S. application No. 61/673,760 filed Jul. 20, 2012, the contents of it being hereby incorporated by reference in its entirety for all purposes.

TECHNICAL FIELD

Various aspects of this disclosure relate to a recording medium and method of forming the same.

BACKGROUND

Multi-level magnetic recording has been used to increase areal density and to increase the capacity of hard disk drives (HDDs). In multi-level magnetic recording, servo pattern information as well as other supporting information is being stored in a dedicated servo layer (also called servo layer). The dedicated servo layer is separate from the dedicated data layer (also called data recording layer). The dedicated data layer is configured to store data.

The coercivity and nucleation field of the dedicated servo layer are required to be high enough such that information stored in the dedicated servo layer are not affected or deleted during writing to the dedicated data layer.

SUMMARY

In various embodiments, a recording medium may be provided. The recording medium may include a servo layer. The recording medium may further include a data recording layer. The recording medium may additionally include a crystal-like soft underlayer (SUL). The data recording layer and the servo layer may be on a same side of the crystal-like soft underlayer.

In various embodiments, a method of forming a recording medium may be provided. The method may include providing a servo layer. The method may further include providing a data recording layer. The method may additionally include providing a crystal-like soft underlayer. The servo layer and the data recording layer may be provided on a same side of the crystal-like soft underlayer.

BRIEF DESCRIPTION OF THE DRAWINGS

The invention will be better understood with reference to the detailed description when considered in conjunction with the non-limiting examples and the accompanying drawings, in which:

FIG. 5C shows a table illustrating the experimental results of the data recording layer and the servo layer of the recording medium according to various embodiments shown in FIG. 4;

FIG. 7B shows a table illustrating the experimental results of the servo layers of recording media according to various embodiments; and FIG. 8 shows a schematic of a method of forming a recording medium.

DETAILED DESCRIPTION

The following detailed description refers to the accompanying drawings that show, by way of illustration, specific details and embodiments in which the invention may be practiced. These embodiments are described insufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In order that the invention may be readily understood and put into practical effect, particular embodiments will now be described by way of examples and not limitations, and with reference to the figures.

The word "over" used with regards to a first layer "over" a second layer, may be used herein to mean that the first layer may be formed "directly on", e.g. in direct contact with, the second layer. The word "over" used with regards to a first layer "over" a second layer may be also be used herein to mean that the first layer may be formed "indirectly on" the second layer with one or more additional layers being arranged between the first layer and the second layer.

It should be understood that the terms "over", "on", "top", "bottom", "down", "side", "corner" etc., when used in the following description are used for convenience and to aid understanding of relative positions or directions, and not intended to limit the orientation of any device or structures or any part of any device or structure.

Figure 1:
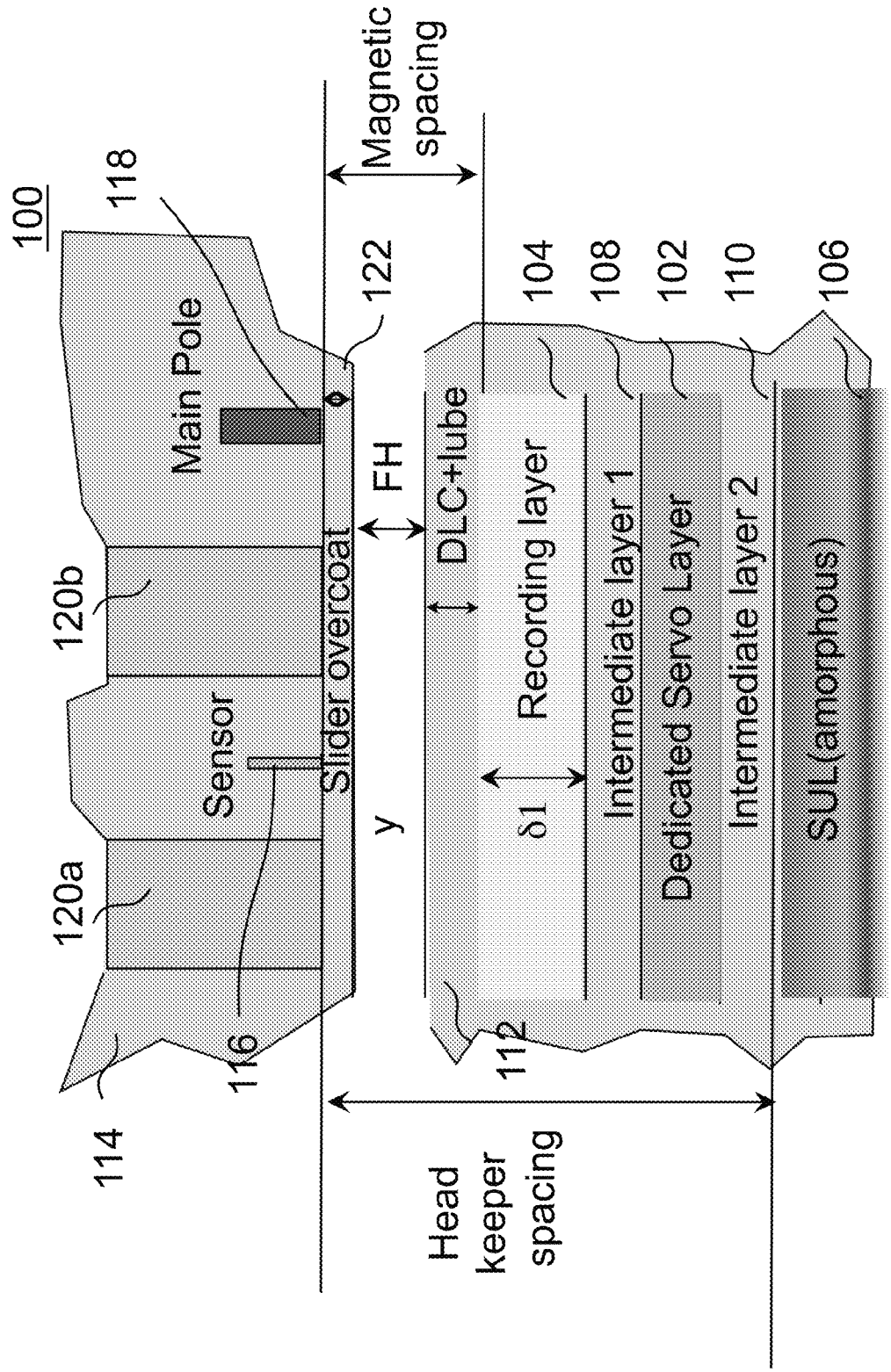
FIG. 1 shows a schematic of a recording medium according to various embodiments.

FIG. 1 shows a schematic 100 of a recording medium according to various embodiments. The recording medium may include a servo layer 102. The recording medium may further include a data recording layer 104. The recording medium may additionally include an amorphous soft underlayer (SUL) 106. The data recording layer 204 and the servo layer 202 may be on (or may be arranged/be provided on) a same side of the amorphous soft underlayer 106.

The recording medium may further include an intermediate layer 108 between the servo layer 102 and the data recording layer 104. The recording medium may also include an intermediate layer 110 between (or may be arranged/be provided between) the servo layer 102 and the amorphous soft underlayer 106.

The servo layer 102, the data recording layer 104 and the amorphous soft underlayer 106 may form a stacked arrangement. Additionally, the intermediate layer 108 and/or the intermediate layer 110 may also form the stack arrangement.

The recording medium may also include an overcoat 112. The overcoat 112 may include diamond like carbon (DLC). The overcoat 112 may also include a lubricant (lube).

The recording medium may be configured for operation with a read/write head 114. The read/write head 114 may include a sensor 116. The sensor 116 may be a read element. The sensor may also include a main pole 118. The main pole 118 may be a write element. The read/write head 114 may also include shields 120a, 120b. The shields 120a, 120b may be configured to shield the read element from the magetic field generated by the write element. The read/write head 114 may further include a slider overcoat 122. The slider overcoat 122 may be configured to provide protection for the read element and/or write element. The recording medium may be separated from the read/write head 114 by a flying height (FH).

Figure 2A:
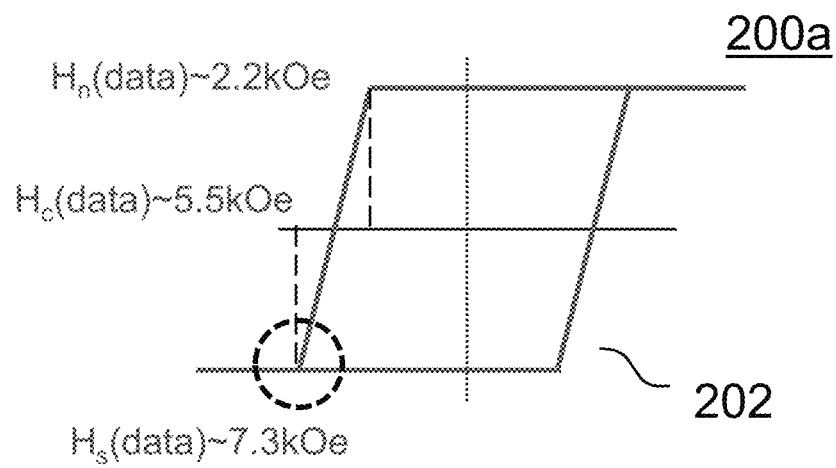
FIG. 2A shows a graph of kerr rotation or magnetization against applied field of a data recording layer shown in FIG. 1.
Figure 2B:
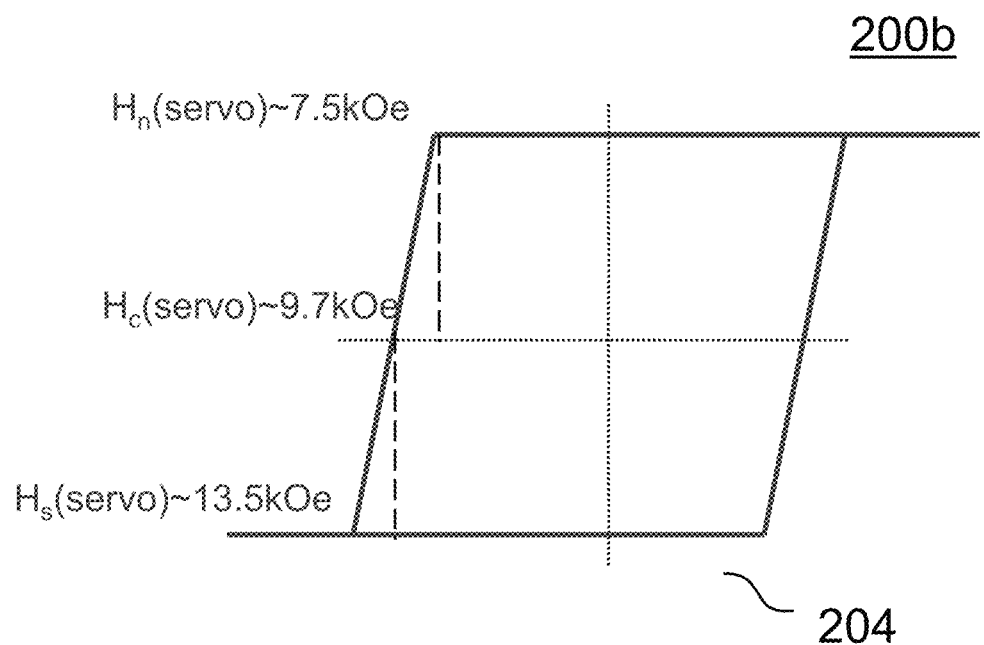
FIG. 2B shows a graph of kerr rotation or magnetization against applied field of a servo layer shown in FIG. 1.

FIG. 2A shows a graph 200a of kerr rotation or magnetization against applied field of the data recording layer shown in FIG. 1. FIG. 2A shows a schematic hysteresis loop 202 of a data recording layer. FIG. 2B shows a graph 200b of kerr rotation or magnetization against applied field of the servo layer shown in FIG. 1. FIG. 2B shows a schematic hysteresis loop 204 of a servo layer. Coercivity (or coercivity value) may be defined as the intensity of the applied magnetic field required to reduce the magnetization of that material to zero after the magnetization of a region (e.g. in the servo layer or the data recording layer) has been driven to saturation. Saturation field (or saturation field value) may be defined as the intensity of the applied magnetic field required to drive the magnetization of the region to saturation. Nucleation field (or nucleation field value) may be defined as the intensity of the applied field at which the magnetization equals to 95% of the saturation magnetization.

In various embodiments, the data recording layer 104 may have a nucleation field value (Hn(data)) and a saturation field value (Hs(data)); and the servo layer 102 also may have a nucleation field value (Hn(servo)) and a saturation field value Hs(servo). The nucleation field value (Hn(servo)) of the servo layer 102 may be required to be higher than or equal to 80% of the saturation field value (Hs(data)) of the data recording layer 104.

$$H_n(\text{servo}) \geq 80\% \times H_s(\text{data}) \qquad (1)$$

In various embodiments, the nucleation field value (Hn(servo)) of the servo layer 102 may be required to be higher than or equal to 80% of the saturation field value (Hs(data)) for the decay of the product of magnetic magnetization Mr and the thickness of the medium, T during the numberless times of data writing of the data layer.

In various embodiments, the servo layer 102 may be configured to be written by a writing head for a servo layer (also known as servo layer writing head). The writing head for the servo layer (servo layer writing head) may have a much higher writing field than the writing field of a writing head for the data recording layer (also known as data recording layer writing head). The servo layer 102 may be required to have a saturation field value Hs (servo) less than or equal to 80% of a maximum writing field (MaxHhead) of the writing head for the servo layer (servo layer writing head), The servo layer writing head may be configured for writing to the servo layer 102. The data recording layer writing head may be configured for writing to the data recording layer 104.

$$H_s(\text{servo}) \geq 80 \times \text{Max} H_{head} \qquad (2)$$

In various embodiments, the saturation field Hs(servo) of the servo layer may be required to be lower than or equal to 80% of the maximum writing field (MaxHhead) of the writing head for servo layer (servo layer writing head) for writeability and overwrite (OW) & low bit error rate (BER).

In various embodiments, the data recording layer may be required to be configured such that the slope of the recording layer is more than the of a conventional magnetic medium, i.e. a single level magnetic medium. In various embodiments, the servo layer may be configured such that the slope of the servo layer is more than the slope of a conventional magnetic medium. The slope α, of a layer may be provided in Equation (3).

$$\alpha = 4\lambda (dM/dH) \qquad (3)$$

H is the intensity of an applied magnetic field to the layer.
M is the intensity of the magnetization field of the layer.

The slope of the data recording layer may be based on the applied magnetic field to the data recording layer and the intensity of the resultant magnetization field of the data recording layer. The slope of the servo layer may be based on the applied magnetic field to the servo layer and the intensity of the resultant magnetization field of the servo layer.

In various embodiments, a for both the data recording layer and the servo layers may be required to be higher than a single layer magnetic medium. However, changes to the data recording layer and/or the servo layer to improve a may lead to deterioration in the segregation of grains.

Figure 2C:
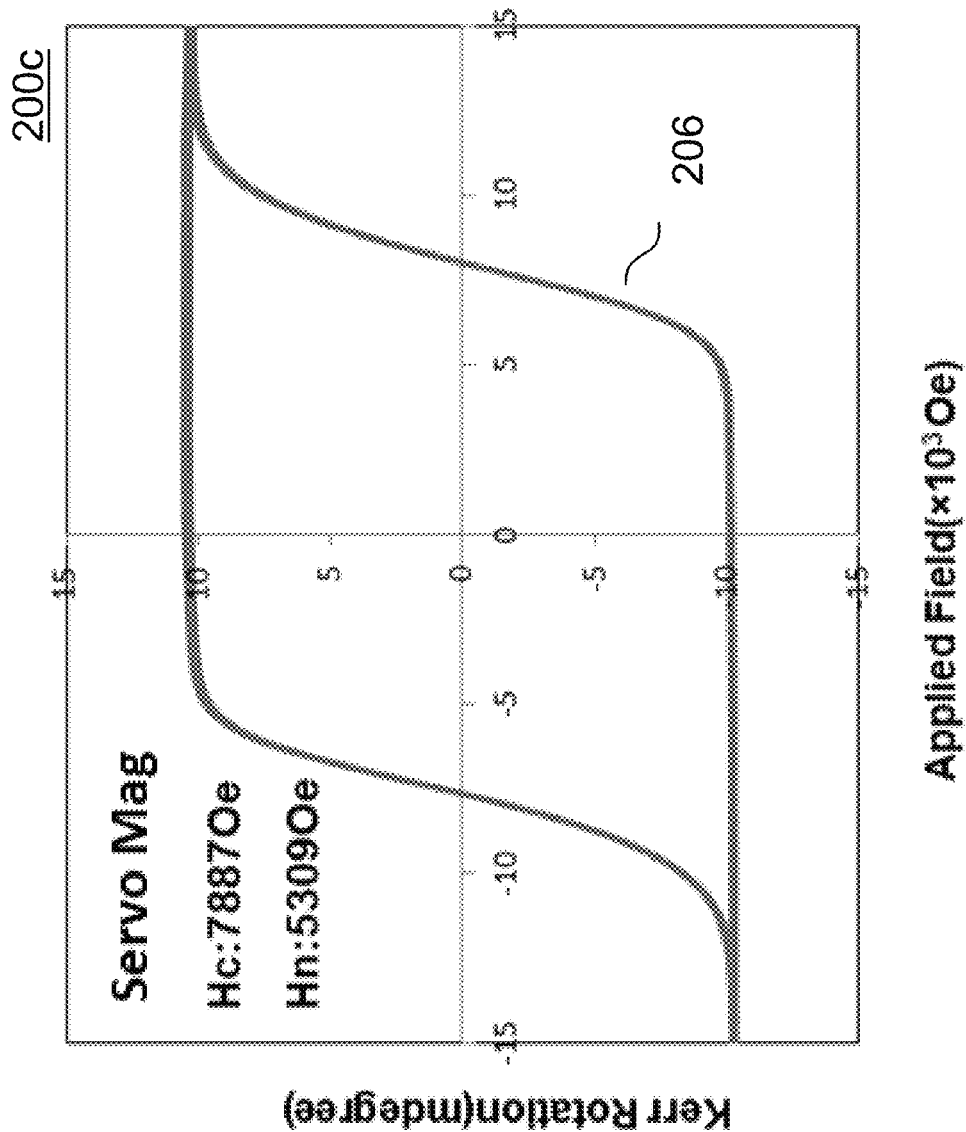
FIG. 2C shows a graph of kerr rotation or magnetization against applied field of the recording medium shown in FIG. 1.

FIG. 2C shows a graph 200c of kerr rotation or magnetization against applied field of the recording medium shown in FIG. 1. FIG. 2C shows a hysteresis loop 204 in a servo layer 102 over an amorphous soft underlayer 106. FIG. 2C shows that with an amorphous underlayer, a saturation field value (Hs(servo)) of about 13 kOe may be reached for the servo layer 102.

Various embodiments may provide for an improved soft underlayer.

Figure 3:
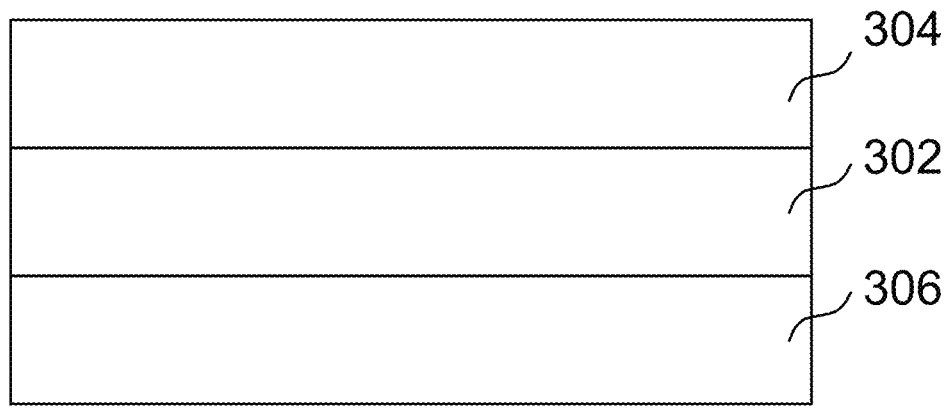
FIG. 3 shows a schematic a recording medium according to various embodiments.

FIG. 3 shows a schematic 300 a recording medium according to various embodiments. The recording medium may include a servo layer 302. The recording medium may further include a data recording layer 304. The recording medium may additionally include a crystal-like soft underlayer (SUL) 306. The data recording layer 304 and the servo layer 302 may on (or may be arranged/be provided on) a same side of the crystal-like soft underlayer 306.

In other words, the recording medium may include a crystal-like soft underlayer 306 having a first side and a second side. The recording medium may include a servo layer 302 and a data recording layer 304 on the same side, e.g. the first side, of the crystal-like soft underlayer 306.

In various embodiments, the servo layer 302, the data recording layer 306 and the crystal-like soft underlayer 306 may form a stacked arrangement.

In various embodiments, the servo layer 302 may be between (or may be arranged/be provided between) the data recording layer 304 and the crystal-like soft underlayer 306. In various embodiments, the servo layer 302 may be over the crystal-like soft underlayer 306. The data recording layer 304 may be over the servo layer 302.

The medium may be a magnetic medium. The data recording layer 304 may be a magnetic or more specifically a ferromagnetic layer. The servo layer 302 may be a magnetic or more specifically a ferromagnetic layer. In various embodiments, the recording medium may be a multi-level recording medium.

The servo layer 302 may be configured to provide or store a servo pattern information. The servo pattern information may include a plurality of servo patterns. In various embodiments, the servo pattern information stored may include addressing information such as auto gain control (AGC), sector address mark (SAM) and/or GrayCode. In various embodiments, all or at least a portion of the servo pattern information may be stored in the servo layer 302. In various embodiments, the data recording layer 304 may be configured to record data information (also called user data). In various embodiments, at least a portion of the servo pattern information may be stored in the data recording layer 304.

The servo layer 302, the data recording layer 304 and the crystal-like soft underlayer 306 may form a single monolithic structure. Further, the servo layer 302, the data recording layer 304 and the crystal-like soft underlayer 306 may be put on the same side of a disk platter such that the servo layer 302 and the data recording layer 304 may be read and/or processed together.

In various embodiments, the crystal-like soft underlayer 306 may be polycrystalline or crystalline. The crystal-like soft underlayer 306 may be a magnetic or more specifically a ferromagnetic layer. The crystal-like soft underlayer 306 may include alloys. The alloys may include one or more materials selected from the group consisting of cobalt, iron, nickel, zirconium, aluminum, carbon, tungsten, and boron. The crystal-like soft underlayer 306 may for instance include CoFeZr.

In various embodiments, the recording medium may further include an amorphous soft underlayer. The crystal-like soft underlayer 306 may be between (or may be arranged/be provided between) the amorphous soft underlayer and the servo layer 302. The crystal-like soft underlayer 306 may be over the amorphous soft underlayer. The servo layer 302 may be over the crystal-like soft underlayer 306. In various embodiments, the servo layer 302 and the data recording layer 304 are on a first side of the crystal-like soft underlayer and the amorphous soft underlayer is on a second side of the crystal-like soft underlayer 306. In various embodiments, the servo layer 302, the data recording layer 304, the crystal-like soft underlayer 306 and the amorphous soft underlayer may form a stacked arrangement.

The amorphous soft underlayer may be a magnetic or more specifically a ferromagnetic layer. The amorphous soft underlayer may include one or more materials selected from the group consisting of cobalt, iron, nickel, zirconium, aluminum, carbon, tungsten, and boron. The amorphous soft underlayer may for instance include one or more of CoFeZr, FeCoZrB and FeCoB.

In various embodiments, the recording medium may further include a substrate. The amorphous soft underlayer may be between (or may be arranged/be provided between) the substrate and the crystal-like soft underlayer 306. In other words, the amorphous soft underlayer may be over the substrate. The crystal-like soft underlayer 306 may be over the amorphous soft underlayer.

In various alternate embodiments, the recording medium may further include a substrate. The crystal-like soft underlayer 306 may be between (or may be arranged/be provided between) the substrate and the servo layer 302. In other words, the crystal-like soft underlayer 306 may be over the substrate. The servo layer 302 may be over the crystal-like soft underlayer 306.

In various embodiments, the recording medium may further include an intermediate layer between (or arranged/be provided between) the servo layer 302 and the data recording layer 304. Additionally or alternatively, the recording medium may further include an intermediate layer between (or arranged/be provided between) the servo layer 302 and the crystal-like soft underlayer 306.

In various embodiments, the servo layer 302 may be configured to have a coercivity value higher than about 10 kilo-oersteds (kOe). In various embodiments, the servo layer 302 may be configured to have a nucleation field value higher than about 7.0 kOe. In various embodiments, the provision of a crystal-like soft underlayer 306 may allow a servo layer 302 with a higher coercivity (Hc) value and/or a higher nucleation field (Hn) value to be used compared with an amorphous soft underlayer. In other words, the substitution of at least a part of an amorphous soft underlayer with a crystal-like soft underlayer 306 may allow material with a higher coercivity value and/or a higher nucleation field value to be used to be used for the servo layer 302.

In various embodiments, the high coercivity (Hc) and higher nucleation field (Hn) of the servo layer 302 may allow the servo pattern information stored or provided in the servo layer 302 to be stable. In various embodiments, the servo layer 302 may be configured such that the servo pattern information stored or provided in the servo layer 302 remains undistorted and/or undeleted by magnetic field used to record data in the data recording layer 304. The high coercivity (Hc) and higher nucleation field (Hn) of the servo layer 302 (compared to the data recording layer 304) may provide a wide range to tune the servo layer 302 for high quality performance of the magnetic layers in the whole recording system.

In various embodiments, the data recording layer 304 may be configured to have a nucleation field value and a saturation field value. In various embodiments, the servo layer 302 may be configured to have a nucleation field value and a saturation field value. In various embodiments, the nucleation field value of the servo layer 302 may be configured to be higher than or equal to 80% of the saturation field value of the data recording layer 304. In other words, the recording medium may be configured such that the nucleation field value of the servo layer 302 may be higher than or equal to 80% of the saturation field value of the data recording layer 304. In various embodiments, the nucleation field value of the data recording layer 304 may be higher than or equal to 80% for the decay of the product of magnetic magnetization Mr and the thickness of the medium, T during the numberless times of data writing of the data layer. In various embodiments, the nucleation field value of the servo layer 302 may be configured to be higher than or equal to about 80% of the saturation field value of the data recording layer 304. In various embodiments, the nucleation field value of the servo layer 302 may be required to be higher than 79% of the saturation field value of the data recording layer 304.

In various embodiments, the servo layer 302 may be configured to be written by a servo layer writing head. The servo layer 302 may be configured to have a saturation field value less than or equal to 80% of a maximum writing field (MaxHhead) of the servo layer writing head. In various embodiments, the saturation field of the servo layer may be configured to be less than or equal to 80% of the maximum writing field (MaxHhead) for writeability and OW & low bit error rate (BER). In various embodiments, the servo layer 102 may be required to have a saturation field value less than or equal to about 80% of maximum writing field of the servo layer writing head. In various embodiments, the servo layer 102 may be required to have a saturation field value less than 80% of maximum writing field of the servo layer writing head.

In various embodiments, the data recording layer 304 may be configured such that the slope of the recording layer 304 is more than the slope of a conventional magnetic medium, i.e. a single level magnetic medium. In various embodiments, the servo layer may be configured such that the slope of the servo layer 302 is more than the slope of a conventional magnetic medium. The slope α, of a layer may be provided in Equation (3) above.

In various embodiments, the recording medium may further include an overcoat layer. The data recording layer 304 may be between (or may be arranged/be provided between) the overcoat layer and the servo layer 302. In other words, the overcoat layer may be over the data recording layer 304. The overcoat layer may include diamond like carbon (DLC). In various embodiments, the overcoat layer may be configured to provide protection for the underlying layers such as the data recording layer 304.

In various embodiments, the servo layer 302 may further include a cap layer. The cap layer of the servo layer 302 may be configured to reduce the saturation field applied to the servo layer 302. The servo layer 302 may include a plurality of sublayers. The cap layer of the servo layer 302 may be the top layer of the plurality of sublayers. In various embodiments, the cap layer of the servo layer may be one sublayer of the plurality of sublayers nearest to the data recording layer 302.

In various embodiments the data recording layer 304 may further include a cap layer. The cap layer of the data recording layer 304 may be configured to reduce the saturation field applied to the data recording layer 304. The data recording layer 304 may include a plurality of sublayers. The cap layer of the data recording layer 304 may be the top layer of the plurality of sublayers. In various embodiments, the cap layer of the data recording layer 304 may be one sublayer of the plurality of sublayers furthest to the data recording layer 304.

In various embodiments, the recording medium may include a substrate. The recording medium may further include a crystal-like soft underlayer 306 on the substrate. The recording medium may additionally include an intermediate layer on the crystal-like soft underlayer 306. The recording medium may further include a servo layer 302 on the intermediate layer. The recording medium may also include a further intermediate layer on the servo layer 302. The recording medium may additionally include a data recording layer 304 on the further intermediate layer. The recording medium may additionally include an overcoat layer on the data recording layer. In various embodiments, two or more of the substrate, the crystal-like soft underlayer 306, the intermediate layer, the servo layer 302, the further intermediate layer, the data recording layer 304 and the overcoat layer may form a stacked arrangement.

In various alternate embodiments, the recording medium may include a substrate. The recording medium may also include an amorphous soft underlayer on the substrate. The recording medium may further include a crystal-like soft underlayer 306 on the amorphous soft underlayer. The recording medium may additionally include an intermediate layer on the crystal-like soft underlayer 306. The recording medium may further include a servo layer 302 on the intermediate layer. The recording medium may also include a further intermediate layer on the servo layer 302. The recording medium may additionally include a data recording layer 304 on the further intermediate layer. The recording medium may additionally include an overcoat layer on the data recording layer. In various embodiments, two or more of the substrate, the amorphous soft underlayer, the crystal-like soft underlayer 306, the intermediate layer, the servo layer 302, the further intermediate layer, the data recording layer 304 and the overcoat layer may form a stacked arrangement.

Figure 4:
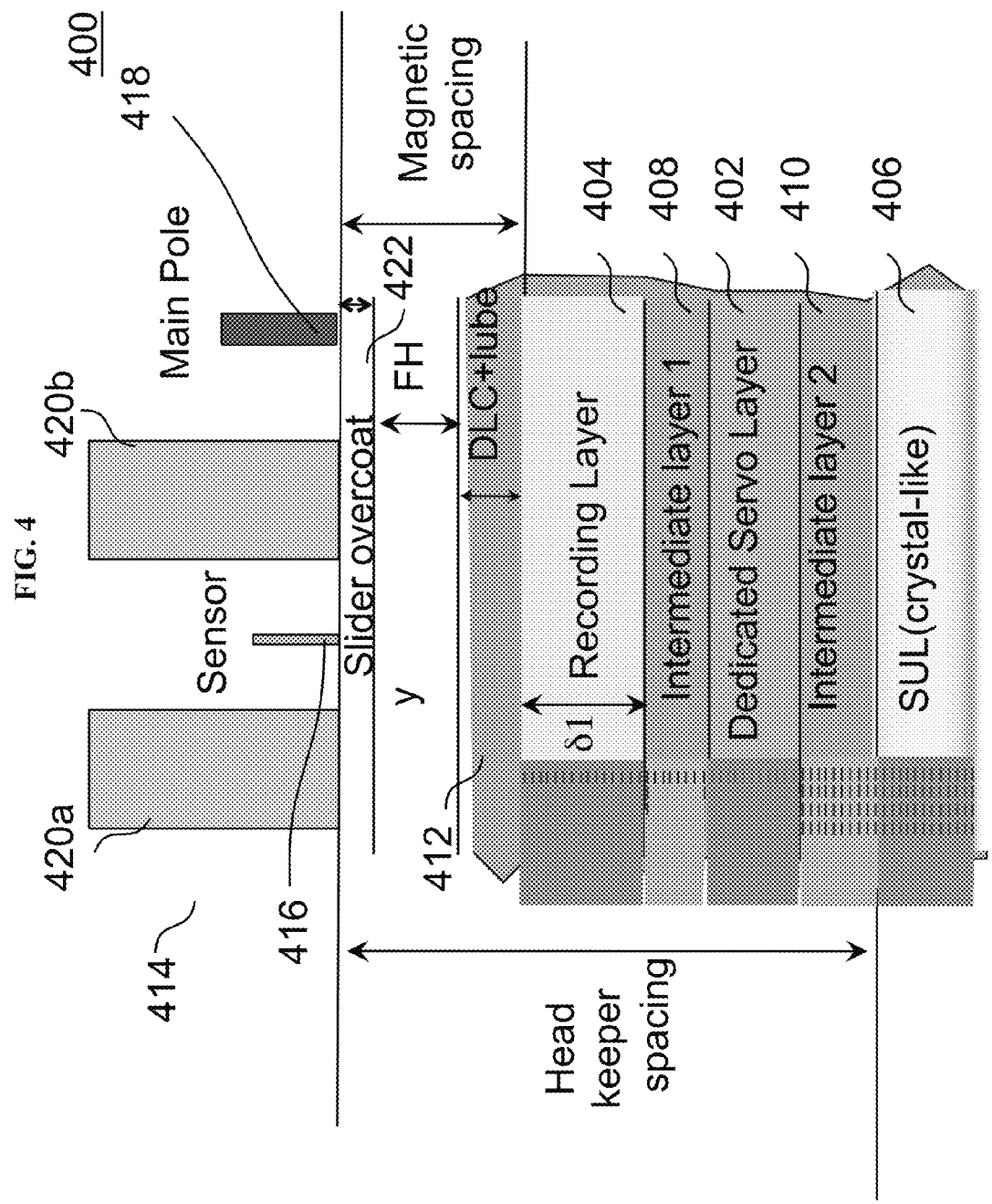
FIG. 4 shows a schematic a recording medium according to various embodiments.

FIG. 4 shows a schematic 400 a recording medium according to various embodiments. The recording medium may include a servo layer 402. The recording medium may further include a data recording layer 404. The recording medium may additionally include a crystal-like soft underlayer 406. The data recording layer 404 and the servo layer 402 may on (or may be arranged/be provided on) a same side of the crystal-like soft underlayer 406.

In various embodiments, the servo layer 402, the data recording layer 406 and the crystal-like soft underlayer 406 may form a stacked arrangement.

In various embodiments, the servo layer 402 may be between the data recording layer 404 and the crystal-like soft underlayer 406. In various embodiments, the servo layer 402 may be over the crystal-like soft underlayer 406. The data recording layer 404 may be over the servo layer 402.

The medium may be a magnetic medium. The data recording layer 404 may be a magnetic or more specifically a ferromagnetic layer. The servo layer 402 may be a magnetic or more specifically a ferromagnetic layer. In various embodiments, the recording medium may be a multi-level recording medium.

The servo layer 402 may be configured to provide or store a servo pattern information. The servo pattern information may include a plurality of servo patterns. In various embodiments, the data recording layer 404 may be comfigured to record data information. The servo layer 402, the data recording layer 404 and the crystal-like soft underlayer 406 may form a single monolithic structure. Further, the servo layer 402, the data recording layer 404 and the crystal-like soft underlayer 406 may be put on the same side of a disk platter such that the servo layer 402 and the data recording layer 404 may be read and/or processed together.

In various embodiments, the crystal-like soft underlayer 406 may be polycrystalline or crystalline. The crystal-like soft underlayer 406 may be a magnetic or more specifically a ferromagnetic layer.

In various embodiments, the recording medium may further include a substrate. The crystal-like soft underlayer 406 may be between (or may be arranged/be provided between) the substrate and the servo layer 402. In other words, the crystal-like soft underlayer 406 may be over the substrate. The servo layer 402 may be over the crystal-like soft underlayer 406.

In various embodiments, the recording medium may further include an intermediate layer 408 between (or arranged/provided between) the servo layer 402 and the data recording layer 404. Additionally or alternatively, the recording medium may further include an intermediate layer 410 between (or arranged/provided between) the servo layer 402 and the crystal-like soft underlayer 406.

In various embodiments, the servo layer 402 may be configured to have a coercivity value higher than about 10 kilo-oersteds (kOe). In various embodiments, the servo layer 402 may be configured to have a nucleation field value higher than about 7.0 kOe. In various embodiments, the provision of a crystal-like soft underlayer 406 may allow a servo layer 402 with a higher coercivity (Hc) value and/or a higher nucleation field (Hn) value to be used compared with an amorphous soft underlayer. In other words, the substitution of at least a part of an amorphous soft underlayer with a crystal-like soft underlayer 406 may allow material with a higher coercivity value and/or a higher nucleation field value to be used to be used for the servo layer 402.

In various embodiments, the high coercivity value (Hc) and higher nucleation field value (Hn) of the servo layer 402 may allow the servo pattern information stored or provided in the servo layer 402 to be stable. In various embodiments, the servo layer 402 may be configured such that the servo pattern information stored or provided in the servo layer 402 remains undistorted and/or undeleted by magnetic field used to record data in the data recording layer 404. The high coercivity value (Hc) and higher nucleation field value (Hn) of the servo layer 402 may provide a wide range to tune the servo layer 402 for high quality performance of the magnetic layers in the whole recording system.

In various embodiments, the data recording layer 404 may be configured to have or may have a nucleation field value and a saturation field value. The servo layer 402 may be configured to have or may have a nucleation field value and a saturation field value. The nucleation field value of the servo layer 402 may be higher or equal to 80% of the saturation field value of the data recording layer 404.

In various embodiments, the servo layer 402 may be configured to be written by a servo layer writing head. The servo layer 402 may be configured to have a saturation field value less than or equal to 80% of a maximum writing field of the servo layer writing head.

In various embodiments, the recording medium may further include an overcoat layer. The data recording layer 404 may be between (or may be arranged/be provided between) the overcoat layer and the servo layer 402. In other words, the overcoat layer may be over the data recording layer 404. The overcoat layer may include diamond like carbon (DLC).

In various embodiments, the servo layer 402 may further include a cap layer. The cap layer of the servo layer 402 may be configured to reduce the saturation field applied to the servo layer 402.

Figure 5A:
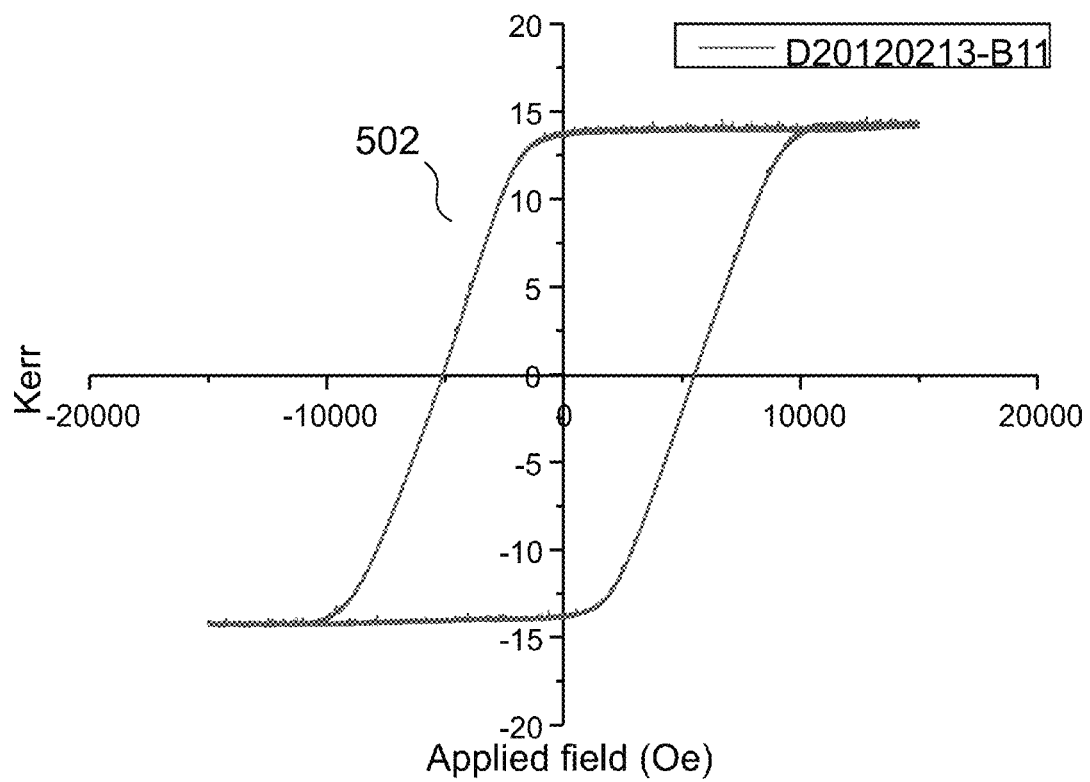
FIG. 5A shows a graph of kerr rotation or magnetization against applied field for a data recording layer.
Figure 5B:
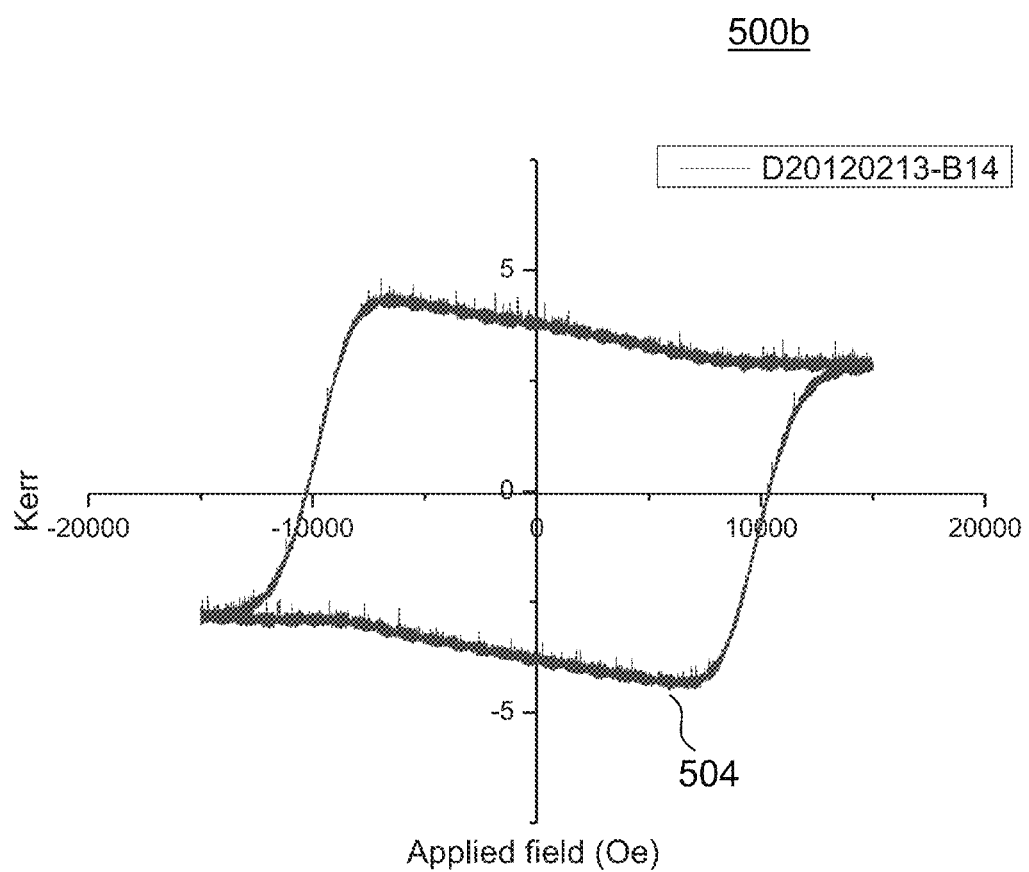
FIG. 5B shows a graph of kerr rotation or magnetization against applied field for a servo layer.

FIG. 5A shows a graph 500a of kerr rotation or magnetization against applied field. FIG. 5A shows a hysteresis loop 502 of a data recording layer 404 of the recording medium according to various embodiments shown in FIG. 4. FIG. 5B shows a graph 500b of kerr rotation or magnetization against applied field. FIG. 5B shows a hysteresis loop 504 of a servo layer 402 of the recording medium according to various embodiments shown in FIG. 4. FIG. 5C shows a table 500c illustrating the experimental results of the data recording layer 404 and the servo layer 402 of the recording medium according to various embodiments shown in FIG. 4. The values in row 506 correspond to experimental results of the data recording layer 404 while the values in row 508 correspond to experimental results of the servo layer 402.

Column 510 indicates the coercivity values Hc (in Oe) of the data recording layer 404 and the servo layer 402. Column 512 indicates the kerr rotation values Theta_s (in degrees) corresponding to the saturation field values of the data recording layer 404 and the servo layer 402. Column 514 indicates the kerr rotation values Theta_r (in degrees) corresponding to the nucleation field values of the data recording layer 404 and the servo layer 402. Column 516 indicates the nucleation field values H_n (in Oe) of the data recording layer 404 and the servo layer 402. Column 518 indicates a ratio S of the value in column 514 to the value in column 512, as provided in Equation 4.

$$S = \frac{Mr}{Ms} = \frac{theta\_r}{theta\_s} \quad (4)$$

Column 520 indicates a value S* that fulfills Equation 5. S* is another indicator of the slope of the hysteresis loop of a layer besides a provided in Equation (3).

$$\left(\frac{dM}{dH}\right)_{H=Hc} = \frac{1}{1-s^*} \cdot \frac{Mr}{Hc} \quad (5)$$

where H is the applied magnetic field to the layer;
M is the resultant magnetization field of the layer;
Hc is the coercivity value of the layer;
Mr is the remnant magnetization field or remanence of the layer when the applied magnetic field to the layer is reduced to zero.

Figure 6:
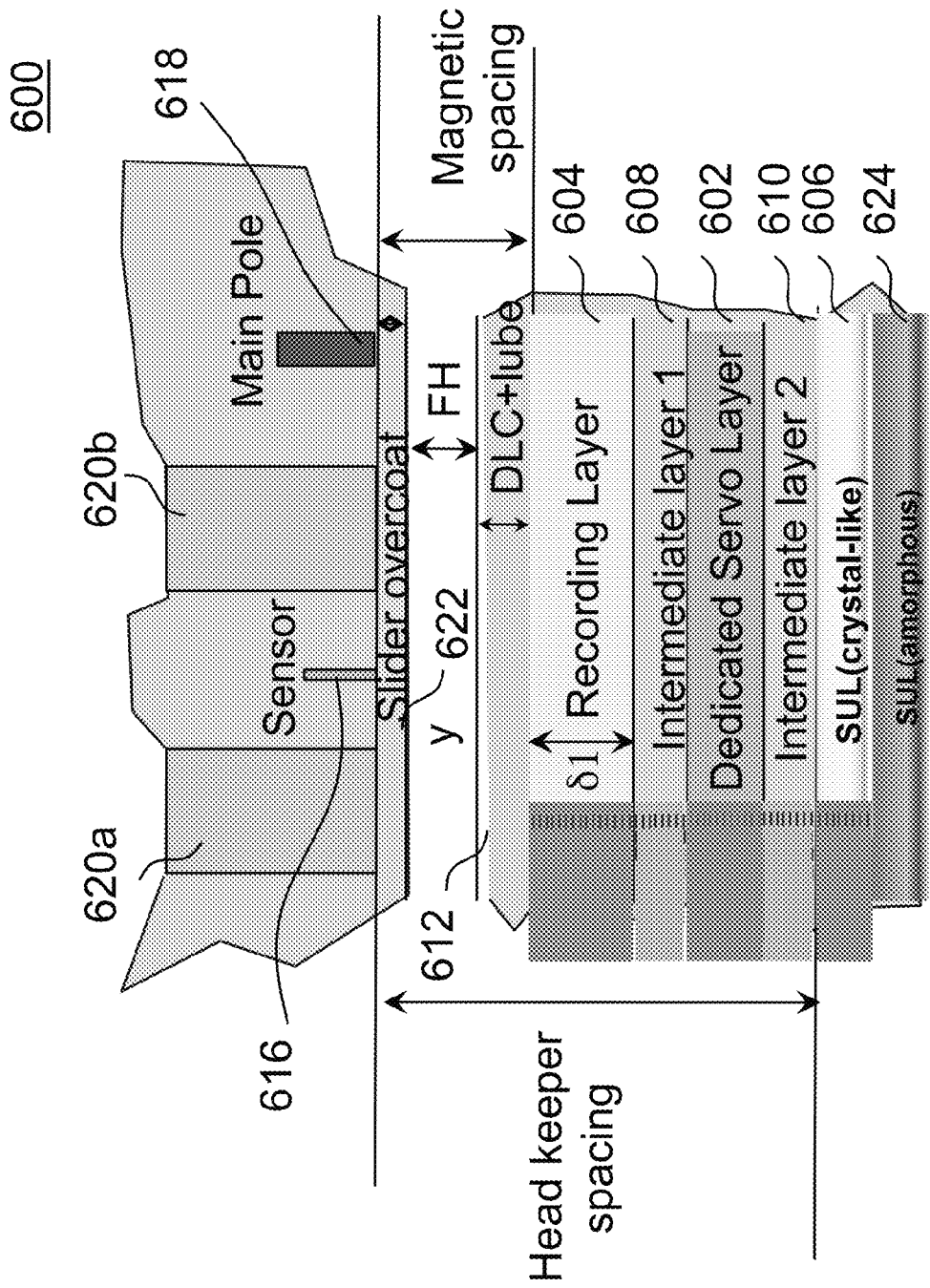
FIG. 6 shows a schematic of a recording medium according to various embodiments.

FIG. 6 shows a schematic 600 of a recording medium according to various embodiments. The recording medium may include a servo layer 602. The recording medium may further include a data recording layer 604. The recording medium may additionally include a crystal-like soft underlayer 606. The data recording layer 604 and the servo layer 602 may on (or may be arranged/be provided on) a same side of the crystal-like soft underlayer 606.

In various embodiments, the servo layer 602, the data recording layer 606 and the crystal-like soft underlayer 606 may form a stacked arrangement.

In various embodiments, the servo layer 602 may be between (or may be arranged/be provided between) the data recording layer 604 and the crystal-like soft underlayer 606. In various embodiments, the servo layer 602 may be over the crystal-like soft underlayer 606. The data recording layer 604 may be over the servo layer 602.

In various embodiments, the recording medium may further include an amorphous soft underlayer 624. The crystal-like soft underlayer 606 may be between (or may be arranged/be provided between) the amorphous soft underlayer 624 and the servo layer 602. In other words, the crystal-like soft underlayer 606 may be over the amorphous soft underlayer 624. The servo layer 502 may be over the crystal-like soft underlayer 606. In various embodiments, a recording medium having both the crystal-like soft underlayer 606 and the amorphous soft underlayer 624 may be referred to as a dual-soft underlayer (dual-SUL) recording medium.

The medium may be a magnetic medium. The data recording layer 604 may be a magnetic or more specifically a ferromagnetic layer. The servo layer 602 may be a magnetic or more specifically a ferromagnetic layer. In various embodiments, the recording medium may be a multi-level recording medium.

The servo layer 602 may be configured to provide or store a servo pattern information. The servo pattern information may include a plurality of servo patterns. In various embodiments, the data recording layer 604 may be comfigured to record data information. The servo layer 602, the data recording layer 604 and the crystal-like soft underlayer 606 may form a single monolithic structure. Further, the servo layer 602, the data recording layer 604 and the crystal-like soft underlayer 606 may be put on the same side of a disk platter such that the servo layer 602 and the data recording layer 604 may be read and/or processed together.

In various embodiments, the crystal-like soft underlayer 606 may be polycrystalline or crystalline. The crystal-like soft underlayer 606 may be a magnetic or more specifically a ferromagnetic layer. In various embodiments, the amorphous soft underlayer 624 may be a magnetic or more specifically a ferromagnetic layer.

In various embodiments, the recording medium may further include a substrate. The amorphous soft underlayer 622 may be between (or may be arranged/be provided between) the substrate and the crystal-like soft underlayer 606. In addition, the crystal-like soft underlayer 606 may be between (or may be arranged/be provided between) the substrate and the servo layer 602. In various embodiments, the crystal-like soft underlayer 606 may be over the amorphous soft underlayer 622. The servo layer 602 may be over the crystal-like soft underlayer 606.

In various embodiments, the recording medium may further include an intermediate layer 508 between (or arranged/provided between) the servo layer 602 and the data recording layer 604. Additionally or alternatively, the recording medium may further include an intermediate layer 610 (or arranged/provided between) between the servo layer 602 and the crystal-like soft underlayer 606.

In various embodiments, the servo layer 602 may be configured to have a coercivity value higher than about 10 kilooersteds (kOe). In various embodiments, the servo layer 602 may be configured to have a nucleation field value higher than about 7.0 kOe. In various embodiments, the provision of a crystal-like soft underlayer 606 may allow a servo layer 602 with a higher coercivity (Hc) value and/or a higher nucleation field (Hn) value to be used compared with an amorphous soft underlayer. In other words, the substitution of at least a part of an amorphous soft underlayer with a crystal-like soft underlayer 606 may allow material with a higher coercivity value and/or a higher nucleation field value to be used to be used for the servo layer 602.

In various embodiments, the high coercivity value (Hc) and higher nucleation field value (Hn) of the servo layer 602 allows the servo pattern information stored or provided in the servo layer 602 to be stable. In various embodiments, the servo layer 602 may be configured such that the servo pattern information stored or provided in the servo layer 602 remains undistorted and/or undeleted by magnetic field used to record data in the data recording layer 604. The high coercivity value (Hc) and higher nucleation field value (Hn) of the servo layer 602 may provide a wide range to tune the servo layer 602 for high quality performance of the magnetic layers in the whole recording system.

In various embodiments, the data recording layer 604 may be configured to have or may have a nucleation field value and a saturation field value. The servo layer 602 may be configured to have or may have a nucleation field value and a saturation field value. The nucleation field value of the servo layer 602 may be higher or equal to 80% of the saturation field value of the data recording layer 604.

In various embodiments, the servo layer 602 may be configured to be written by a servo layer writing head. The servo layer 602 may be configured to have a saturation field value less than or equal to 80% of a maximum writing field of the servo layer writing head.

In various embodiments, the recording medium may further include an overcoat layer. The data recording layer 604 may be between (or may be arranged/be provided between) the overcoat layer and the servo layer 602. In other words, the overcoat layer may be over the data recording layer 604. The overcoat layer may include diamond like carbon (DLC).

In various embodiments, the servo layer 602 may further include a cap layer. The cap layer of the servo layer 602 may be configured to reduce the saturation field applied to the servo layer 602.

Figure 7A:
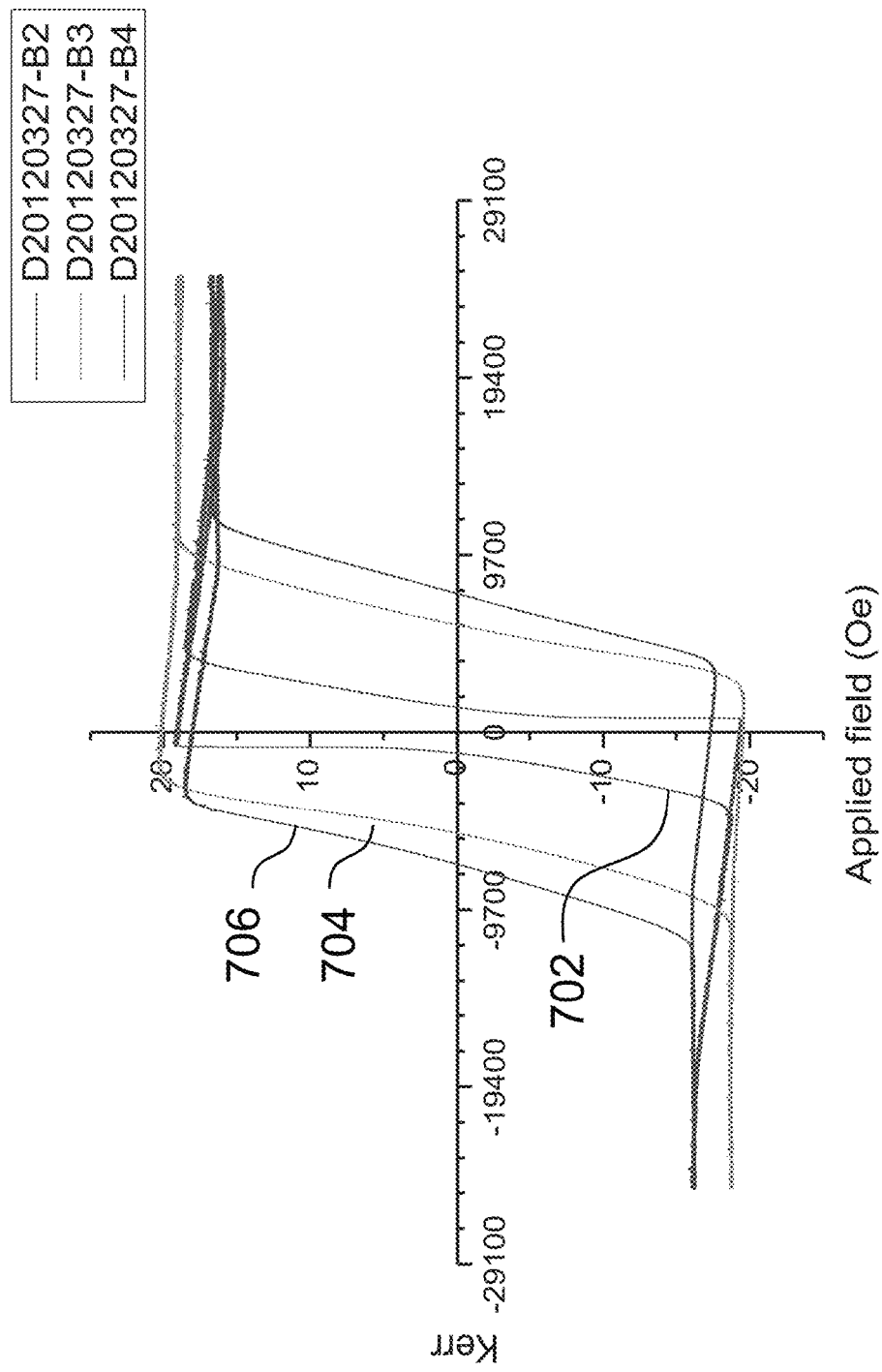
FIG. 7A shows a graph of kerr rotation or magnetization against applied field for servo layers of recording media according to various embodiments.

FIG. 7A shows a graph 700a of kerr rotation or magnetization against applied field. FIG. 7A shows a first hysteresis loop 702 of a servo layer over an amorphous soft underlayer according to various embodiments. FIG. 7A further shows a second hysteresis loop 704 of a servo layer of a dual-SUL recording medium according to various embodiments. FIG. 7C also shows a third hysteresis loop 706 of a servo layer over a crystal-like soft underlayer according to various embodiments.

FIG. 7B shows a table 700b illustrating the experimental results of the servo layers of recording media according to various embodiments. The values in row 708 correspond to experimental results of the servo layer over an amorphous soft underlayer according to various embodiments. The values in row 710 correspond to experimental results of the servo layer of a dual-SUL recording medium according to various embodiments. The values in row 714 correspond to experimental results of the servo layer over a crystal-like soft underlayer according to various embodiments.

Column 714 indicates the coercivity values Hc (in Oe) of the servo layers. Column 716 indicates the kerr rotation values theta_s (in degrees) corresponding to the saturation field values of the servo layers. Column 718 indicates the kerr rotation values theta_r (in degrees) corresponding to the nucleation field values of the servo layers. Column 720 indicates the nucleation field values H_n of the servo layers. Column 722 indicates a ratio of the value S in column 718 to the value in column 716, as provided in Equation 4. Column 724 indicates a value S* that fulfills Equation 5.

FIG. 8 shows a schematic 800 of a method of forming a recording medium. The method may include in 802, providing a servo layer. The method may further include in 804, providing a data recording layer. The method may additionally include in 806, providing a crystal-like soft underlayer. The servo layer and the data recording layer may be provided or be arranged on a same side of the crystal-like soft underlayer.

In other words, the method may include providing a crystal-like soft underlayer having a first side and a second side. The method may further include arranging a data recording layer and a servo layer on the same side of the crystal-like soft underlayer.

In various embodiments, the servo layer, the data recording layer and the crystal-like soft underlayer may form a stacked arrangement.

In various embodiments, servo layer and the data recording layer provided or arranged on the same side of the crystal-like soft underlayer may include the servo layer provided or arranged between the data recording layer and the crystal-like soft underlayer. In other words, arranging the servo layer and the data recording layer on the same side of the crystal-like soft under layer may include arranging the servo layer over the crystal-like soft under layer and arranging the data recording layer over the servo layer.

The method may further include proving an amorphous soft underlayer. The crystal-like soft underlayer may be arranged or be provided between the amorphous soft underlayer and the servo layer.

In various embodiments, the method may include arranging the crystal-like soft underlayer over the amorphous soft underlayer and arranging the servo layer over the crystal-like soft underlayer.

In various embodiments, the method may further include providing a substrate. The amorphous soft underlayer may be arranged or be provided between the substrate and the crystal-like soft underlayer. In various embodiments, the method may include arranging the amorphous soft underlayer over the substrate and arranging the crystal-like soft underlayer over the amorphous soft underlayer.

In various alternate embodiments, the method may further include providing a substrate. The crystal-like soft underlayer may be be provided or be arranged between the substrate and the servo layer. In various embodiments, the method may include arranging the crystal-like soft underlayer over the substrate and arranging the servo layer over the crystal-like soft underlayer.

In various embodiments, an intermediate layer may be provided or be arranged between the servo layer and the data recording layer. Alternatively or additionally, an intermediate layer may be provided or be arranged between the servo layer and the crystal-like soft underlayer.

In various embodiments, the servo layer may be configured to provide a servo pattern information. In various embodiments, the data recording layer may be configured to record data information.

In various embodiments, the servo layer may be configured to have a coercivity value higher than about 10 kilo-oersteds (kOe). In various embodiments, the servo layer may be configured to have a nucleation field value higher than about 7.0 kOe.

In various embodiments, the data recording layer may be configured to have a nucleation field value and a saturation field value, the nucleation field value higher than or equal to 80% of the saturation field value. In various embodiments, the data recording layer may be configured to have or may have a nucleation field value and a saturation field value. The servo layer may be configured to have or may have a nucleation field value and a saturation field value. The nucleation field value of the servo layer may be higher or equal to 80% of the saturation field value of the data recording layer.

In various embodiments, the servo layer may be configured to be written by a servo layer writing head. The servo layer may be configured to have a saturation field value less than or equal to 80% of a maximum writing field of the servo layer writing head.

The method may further include proving an overcoat layer. The data recording layer be provided or be arranged between the overcoat layer and the servo layer. In other words, the method may include arranging the data recording layer over the servo layer and arranging the overcoat layer over the data recording layer.

The overcoat layer may include diamond like carbon (DLC).

In various embodiments, the servo layer may further include a cap layer. The cap layer of the servo layer may be configured to reduce the saturation field applied to the servo layer.

In various embodiments, the method may include arranging a crystal-like soft underlayer on a substrate. The method may further include arranging an intermediate layer on the crystal-like soft underlayer. The method may also include arranging a servo layer on the intermediate layer. The method may additionally include arranging a further intermediate layer on the servo layer. The method may further include arranging a data recording layer on the further intermediate layer. The method may also include an overcoat layer over the data recording layer. The method may include forming a stacked arrangement including two or more of the substrate, the crystal-like soft underlayer, the intermediate layer, the servo layer, the further intermediate layer, the data recording layer and the overcoat layer.

In various embodiments, the method may include arranging an amorphous soft underlayer on a substrate. The method may also include arranging a crystal-like soft underlayer on the amorphous soft underlayer. The method may further include arranging an intermediate layer on the crystal-like soft underlayer. The method may also include arranging a servo layer on the intermediate layer. The method may additionally include arranging a further intermediate layer on the servo layer. The method may further include arranging a data recording layer on the further intermediate layer. The method may also include an overcoat layer over the data recording layer. The method may include forming a stacked arrangement including two or more of the substrate, the amorphous soft underlayer, the crystal-like soft underlayer, the intermediate layer, the servo layer, the further intermediate layer, the data recording layer and the overcoat layer.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

We claim:

1. A recording medium comprising:
   a servo layer configured to have a nucleation field value, wherein the servo layer is a magnetic layer;
   a data recording layer configured to have a saturation field value, wherein the nucleation field value of the servo layer is greater than or equal to 80% of the saturation field value of the data recording layer, and wherein the data recording layer is a magnetic layer;
   a first intermediate layer disposed on the servo layer, wherein the data recording layer is disposed on the first intermediate layer;
   a second intermediate layer, wherein the servo layer is disposed on the second intermediate layer;
   a crystalline underlayer comprising a first side and a second side, wherein the second side opposes the first side, and wherein the second intermediate layer is disposed on the first side of the crystalline underlayer; and
   an amorphous underlayer disposed on the second side of the crystalline underlayer, wherein the crystalline underlayer or the amorphous underlayer is a magnetic layer.

2. The recording medium according to claim 1, further comprising a substrate,
   wherein the amorphous underlayer is disposed between the substrate and the crystalline underlayer.

3. The recording medium according to claim 1, further comprising a substrate,
   wherein the crystalline underlayer is disposed between the substrate and the servo layer.

4. The recording medium according to claim 1, wherein the servo layer is configured to provide a servo pattern information.

5. The recording medium according to claim 1, wherein the data recording layer is configured to record data.

6. The recording medium according to claim 1, wherein the servo layer is configured to have a coercivity value greater than 10 kOe.

7. The recording medium according to claim 1, wherein the nucleation field value of the servo layer is greater than 7.0 kOe.

8. A system comprising:
   a head; and
   the recording medium according to claim 1,
   wherein
      the head writes data to the servo layer, and
      the servo layer has a saturation field value less than or equal to 80% of a maximum writing field value of the head.

9. The recording medium according to claim 1, further comprising an overcoat layer, wherein the data recording layer is disposed between the overcoat layer and the servo layer.

10. The recording medium according to claim 9, wherein the overcoat layer comprises diamond like carbon (DLC).

11. The recording medium according to claim 1, wherein:
the servo layer comprises a cap layer; and
the cap layer reduces a saturation field applied to the servo layer.

12. The recording medium of claim 1, wherein:
the first intermediate layer is in contact with the servo layer;
the data recording layer is in contact with the first intermediate layer;
the servo layer is in contact with the second intermediate layer;
the second intermediate layer is in contact with the first side of the crystalline underlayer; and
the amorphous underlayer is in contact with the second side of the crystalline underlayer.

13. The recording medium of claim 1, wherein the crystalline underlayer and the amorphous underlayer are magnetic layers.

14. A system comprising:
a head; and
the recording medium of claim 1,
wherein
a change in a resultant magnetization field of the servo layer divided by a change in a magnetic field applied to the servo layer is equal to a first ratio multiplied by a reciprocal of one minus a second ratio,
the first ratio is equal to a remnant magnetization field of the servo layer when the applied magnetic field is reduced to zero, and
the second ratio is an indicator of a slope of a hysteresis loop of the servo layer.

15. A system comprising:
a head; and
the recording medium of claim 1,
wherein
a change in a resultant magnetization field of the data recording layer divided by a change in a magnetic field applied to the data recording layer is equal to a first ratio multiplied by a reciprocal of one minus a second ratio,
the first ratio is equal to a remnant magnetization field of the data recording layer when the applied magnetic field is reduced to zero, and
the second ratio is an indicator of a slope of a hysteresis loop of the data recording layer.

16. A method of forming a recording medium, the method comprising:
providing an amorphous underlayer layer;
applying a crystalline underlayer on the amorphous underlayer, wherein the crystalline underlayer or the amorphous underlayer is a magnetic layer;
applying a first intermediate layer on the crystalline underlayer;
applying a servo layer on the first intermediate layer, wherein the servo layer is a magnetic layer and is configured to have a nucleation field value;
applying a second intermediate layer on the servo layer; and
applying a data recording layer on the second intermediate layer, wherein the data recording layer is a magnetic layer and is configured to have a saturation field value, and wherein the nucleation field value of the servo layer is greater than or equal to 80% of the saturation field value of the data recording layer.

17. The method according to claim 16, further comprising providing a substrate,
wherein the amorphous underlayer is disposed between the substrate and the crystalline underlayer.

* * * * *